C. NELSON.
COFFEE MACHINE.
APPLICATION FILED AUG. 24, 1907.
1,096,455.  Patented May 12, 1914.
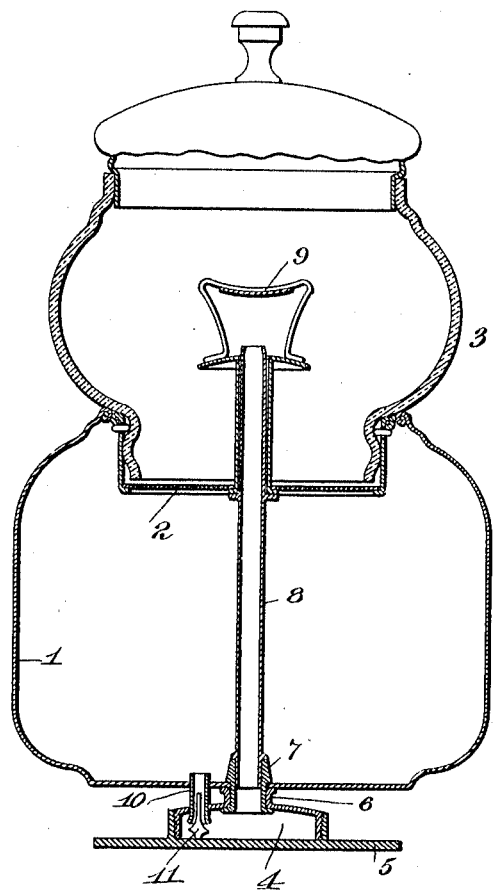
Witnesses:
Inventor
Charles Nelson
By Dyer & Dyer
Attorneys.

UNITED STATES PATENT OFFICE.

CHARLES NELSON, OF BROOKLYN, NEW YORK, ASSIGNOR TO S. STERNAU & COMPANY, OF NEW YORK, N. Y., A COPARTNERSHIP COMPOSED OF SIGMUND STERNAU AND LIONEL STRASSBURGER.

COFFEE-MACHINE.

1,096,455.  Specification of Letters Patent.  Patented May 12, 1914.

Application filed August 24, 1907. Serial No. 389,996.

*To all whom it may concern:*

Be it known that I, CHARLES NELSON, a subject of the King of Sweden, residing in the borough of Brooklyn, county of Kings, and State of New York, have invented a new and useful Coffee-Machine, (Case H,) of which the following is a specification.

The object I have in view is the production of a coffee machine, coffee pot or analogous article for the making of an infusion of the substance employed for that purpose in the minimum time, which object will be attained by a simple and cheap mechanism, which may be readily cleansed.

Other objects will more fully appear from the following specification and accompanying drawing, considered together or separately.

The drawing represents a vertical section of a coffee machine embodying my invention.

The coffee machine illustrated comprises a body or liquid receptacle 1, a screen, sieve, or perforated coffee container 2, and the usual globe or transparent cover 3, by means of which the operation of the device may be observed.

Attached to the body 1 is a chamber 4 of considerably smaller capacity than such body. This chamber is adapted to be heated. In the construction shown, it is provided with a flange 5, which serves the double purpose of conducting heat to the chamber 4 and insulating the contents of the body 1 from heat. When the device is used in connection with a coffee pot or tea pot, the flange serves the additional purpose of a foot for sustaining the device upon the stove. The flange 5, which is shown as formed integrally with the bottom of the chamber 4, is connected to the chamber by screw-threads as shown, so that by removing the flange and bottom of the chamber, the inside is rendered accessible.

The heating chamber 4 is connected to the body 1 by a neck 6, which is shown as in the form of a short length of tubing, which may be integrally formed with the walls of the chamber 4 or separate therefrom. The means of connection of the neck to the bottom of the body is a hollow bushing or collar 7, having a flange which bears against the inner side of the bottom of the body 1 and a hollow stem which extends within the neck 6, and is flanged at the bottom as shown. This bushing or collar forms the securing means of the chamber 4 to the body 1.

Communication between the chamber 4 and the globe 3 is made through the agency of the centrally located outlet tube 8, which is shown as engaging in the upper part of the bushing or collar and passing through the center of the screen 2. The upper open end of the outlet tube is arranged below the usual deflector 9. Communication between the body 1 and the chamber 4 is by way of the inlet tube 10, such tube being a short length of tubing passing through openings in the bottom of the body 1 and top of the chamber 4 to one side of the neck 6. The inlet tube 10 lies off to one side of the central tube 8. Both upper and lower extremities of the outlet tube are open.

The circulation of liquid is from the body 1 through the inlet tube 10 in the chamber 4, where it is subject to heat and is driven up through the outlet tube 8 against the deflector 9 and sprayed over the contents of the screen 2, whereupon it percolates through such contents back into the body 1. In order to prevent the passage of the liquid in the opposite direction and to direct the circulation downward a valve 11 is provided. The valve is best made as shown and comprises an enlarged body with a stem which extends into the inlet tube 10. This stem serves the purpose of guiding the valve against its seat, which is the lower extremity of the inlet tube 10. The inlet tube 10 should extend a sufficient distance into the chamber 4 so that the valve 11 may rest upon the bottom of such chamber when the valve is in the open position, and at the same time the stem of the valve will lie within the tube 10. When the valve is resting upon the bottom, the circulation downward through the tube 10 is uninterrupted. The weight of the valve keeps it normally open, *i. e.*—when no heat is applied to the heating chamber 4. The top of the heating chamber is separated some distance from the bottom of the main receptacle, so that there is thereby produced an air space between these two walls which reduces the temperature of the contents of the receptacle. The bores of both of the tubes 8 and 10 extend through both of these walls. When the bottom of the chamber 2 is removed the valve may be removed and cleaned, as may also the tube 10. The tube 8 may be permanently attached to the bushing or collar 7 or may rest therein and be removable.

In accordance with the provisions of the patent statutes, I have described the principle of my invention, together with the apparatus which I now consider to represent the best embodiment thereof, but I desire to have it understood that the apparatus shown is merely illustrative and that the invention can be carried out in other ways.

Having now described my invention, what I claim as new and desire to secure by Letters Patent, is:

A coffee machine having a body and a small chamber communicating therewith, an inlet tube communicating between the body and the chamber and a valve within the tube, the said valve having a stem which rests within the tube, the end of the valve resting upon the bottom of the chamber.

This specification signed and witnessed this 21st day of August, 1907.

CHARLES NELSON.

Witnesses:
LEONARD H. DYER,
J. F. COLEMAN.

---

Copies of this patent may be obtained for five cents each, by addressing the "Commissioner of Patents, Washington, D. C."